(12) United States Patent
Utaka et al.

(10) Patent No.: US 11,337,466 B2
(45) Date of Patent: May 24, 2022

(54) METHOD FOR MANUFACTURING CORE-MATERIAL-CONTAINING GARMENT, AND CORE-MATERIAL-CONTAINING GARMENT

(71) Applicant: UTAX CO., LTD., Hyogo (JP)

(72) Inventors: Shohei Utaka, Hyogo (JP); Yukihiro Miyake, Hyogo (JP); Toshihide Iwai, Hyogo (JP)

(73) Assignee: UTAX CO., LTD., Nishiwaki Hyogo (JP)

( * ) Notice: Subject to any disclaimer, the term of this patent is extended or adjusted under 35 U.S.C. 154(b) by 80 days.

(21) Appl. No.: 16/495,757

(22) PCT Filed: May 30, 2018

(86) PCT No.: PCT/JP2018/020739
§ 371 (c)(1),
(2) Date: Sep. 19, 2019

(87) PCT Pub. No.: WO2018/225604
PCT Pub. Date: Dec. 13, 2018

(65) Prior Publication Data
US 2021/0059320 A1    Mar. 4, 2021

(30) Foreign Application Priority Data

Jun. 8, 2017   (JP) .............................. JP2017-113201

(51) Int. Cl.
*A41C 3/14*       (2006.01)
*A41C 3/10*       (2006.01)
(Continued)

(52) U.S. Cl.
CPC ................ *A41C 3/142* (2013.01); *A41C 3/10* (2013.01); *A41C 5/00* (2013.01); *B32B 5/26* (2013.01);
(Continued)

(58) Field of Classification Search
CPC ..... B32B 7/12; B32B 5/26; B32B 2266/0278; B32B 2266/14; B32B 2437/00; C09J 5/06;
(Continued)

(56) References Cited

U.S. PATENT DOCUMENTS 5,389,168 A  *  2/1995  Litchholt ............ B32B 37/1284
                                                                156/160
2007/0298682 A1* 12/2007  Liu .......................... A41C 3/10
                                                                450/39

FOREIGN PATENT DOCUMENTS

JP       3-135468 A      6/1991
JP       2004-11056 A    1/2004
(Continued)

OTHER PUBLICATIONS

International Search Report in International Application No. PCT/JP2018/020739 dated Jun. 27, 2018.
(Continued)

*Primary Examiner* — Vishal I Patel
(74) *Attorney, Agent, or Firm* — Stephen J. Weyer, Esq.; Stites & Harbison, PLLC (57) ABSTRACT

A method for manufacturing a core-material-containing garment, the method includes: a feeding step of feeding fabric (2) in a wound state onto a conveyor table (1) without relaxing or substantially relaxing the fabric (2); a core material application step of applying a reactive hot-melt adhesive to the fabric (2) on the conveyor table (1) to form a core material (12); an adhesive application step of applying a bonding hot-melt adhesive (13) configured to bond the fabric (2); and a drying step of drying the applied bonding hot-melt adhesive (13), and in the core material application step, the reactive hot-melt adhesive is mixed with nitrogen gas and foamed, and the reactive hot-melt adhesive is applied using an application device provided with a resin
(Continued)

discharge unit that is movable in at least two axial directions of vertical and horizontal directions.

4 Claims, 6 Drawing Sheets

(51) Int. Cl.
    *A41C 5/00*      (2006.01)
    *B32B 5/26*      (2006.01)
    *B32B 7/12*      (2006.01)
    *C09J 5/06*      (2006.01)
    *C09J 5/08*      (2006.01)

(52) U.S. Cl.
    CPC    *B32B 7/12* (2013.01); *C09J 5/06* (2013.01); *C09J 5/08* (2013.01); *B32B 2266/0278* (2013.01); *B32B 2266/14* (2016.11); *B32B 2437/00* (2013.01); *C09J 2400/266* (2013.01)

(58) Field of Classification Search
CPC ....... C09J 5/08; C09J 2400/266; A41C 3/142; A41C 3/10; A41C 3/128; A41C 3/0007; A41C 5/00; A41B 2500/54
See application file for complete search history.

(56) References Cited

FOREIGN PATENT DOCUMENTS

| | | |
|---|---|---|
| JP | 2013-155442 A | 8/2013 |
| WO | WO-2007089848 A2 * | 8/2007 ............... A41C 5/00 |

OTHER PUBLICATIONS

Written Opinion in International Application No. PCT/JP2018/020739 dated Jun. 27, 2018.

* cited by examiner

METHOD FOR MANUFACTURING CORE-MATERIAL-CONTAINING GARMENT, AND CORE-MATERIAL-CONTAINING GARMENT

TECHNICAL FIELD

The present invention relates to a garment, such as a brassiere or a waist nipper, using a core material configured to alter a body shape and relates to a method for molding the core material.

BACKGROUND ART

Conventionally, in female garments such as a brassiere and a waist nipper, a core material made of metal or resin is inserted to alter a body shape. Normally, fabric is folded to form a casing, the casing is attached to a main body of a garment such as a brassiere, a core material is inserted into the casing, and an opening of the casing is closed, to fix the core material to the garment. As thus described, a number of steps are required for fixing the core material to the garment, and in sawing, the periphery of the core material is required to be sewn, which may cause a danger of needle breakage.

In this regard, Patent Literature 1 discloses a method in which a casing for inserting a core material is not formed, but the core material is directly bonded to each of cup sections or the like of a brassiere with a pressure-sensitive adhesive, and a cup material around the core material is bonded and fixed. Patent Literature 2 discloses a method in which a core material of ethylene-vinyl acetate (EVA) or the like and a sheet are cut into a predetermined shape in advance, and the obtained core material and the sheet are sandwiched between and bonded to pieces of cup fabric and then molded, and a certain effect has been expected in reducing the number of steps and reducing the needle breakage.

CITATIONS LIST

Patent Literatures

Patent Literature 1: Japanese Unexamined Patent Application Publication No. 2013-87404
Patent Literature 2: Japanese Translation of PCT International Application Publication No. 2014-506964

SUMMARY OF INVENTION

Technical Problems

However, in the methods of Patent Literatures 1 and 2, the core material needs to be cut into a predetermined shape in advance. In addition, the mold and the core material are difficult to be positioned, and even when placed at predetermined positions, the mold and the core material may be displaced during bonding, which has been problematic.

Therefore, the present invention has been made to solve such a problem, and an object of the present invention is to provide a method for manufacturing a core-material-containing garment, capable of reducing the number of steps and facilitating positioning.

Solutions To Problem

In order to solve the above problem, a method for manufacturing a core-material-containing garment according to the present invention is a method for manufacturing a core-material-containing garment by using a core material configured to alter a body shape, the method including a core material application step of applying a reactive hot-melt adhesive to fabric to form a core material.

Here, the reactive hot-melt adhesive is preferably mixed with nitrogen gas and foamed, and the reactive hot-melt adhesive may be applied using an application device provided with a resin discharge unit that is movable in at least two axial directions of vertical and horizontal directions.

Further, the method preferably includes, before the core material application step, a feeding step of feeding fabric in a wound state onto a table without relaxing or substantially relaxing the fabric, and the method preferably includes, after the core material application step: an adhesive application step of applying a bonding hot-melt adhesive configured to bond the fabric on the table; and a drying step of drying the applied bonding hot-melt adhesive.

Moreover, after the reactive hot-melt adhesive is applied to one piece of fabric and cured to form a core material in the core material application step, the other piece of fabric may be superimposed on the core material in the adhesive application step, and a bonding hot-melt adhesive may be applied, avoiding the core material, to prevent the core material from adhering to the other piece of fabric.

As a core-material-containing garment according to the present invention, a core-material-containing garment, such as a brassiere, may have cup sections and use in each of the cup sections a core material configured to alter a body shape, the core-material-containing garment including a core material formed of a reactive hot-melt adhesive in a ω shape around the cup sections.

Further, a garment such as a brassiere may have cup sections and use in each of the cup sections a core material configured to alter a body shape, the garment including a core material formed by applying a reactive hot-melt adhesive such that the reactive hot-melt adhesive continues from a shoulder strap section of the garment having the cup sections into each of the cup sections through a portion above an intermediate height of a side portion of the cup section, makes one run or more on a side of a lower portion of the cup section, proceeds to a base of an inner edge of the shoulder strap along an outer periphery of the cup, and leaves the outer periphery of the cup to reach a vicinity of a top of the shoulder strap along the inner edge of the shoulder strap.

Furthermore, a garment such as a brassiere may have cup sections and use in each of the cup sections a core material configured to alter a body shape, the garment including a core material formed by applying a reactive hot-melt adhesive to one piece of fabric and curing the applied reactive hot-melt adhesive, and the other piece of fabric may be superimposed on the core material, and a bonding hot-melt adhesive may be applied, avoiding the core material, to prevent the core material from adhering to the other piece of fabric.

Advantageous Effects of Invention

As described above, according to the method for manufacturing a core-material-containing garment in the present invention, a core-material-containing garment can be manufactured, reducing the number of steps and facilitating the positioning.

DESCRIPTION OF EMBODIMENT

Hereinafter, a method for manufacturing a core-material-containing garment according to the present invention will be described in detail based on an embodiment.

The method for manufacturing a core-material-containing garment according to the present invention includes directly applying a reactive hot-melt adhesive to fabric where a core material is to be placed and molding the applied reactive hot-melt adhesive as the core material. The reactive hot-melt adhesive is heat-resistant after the curing and for example, even when the reactive hot-melt adhesive is used in combination with a bonding hot-melt adhesive and a portion to which the bonding hot-melt adhesive has been applied is bonded, a portion to which the reactive hot-melt adhesive has been applied is not bonded to other fabric. Meanwhile, immediately after the application of the reactive hot-melt adhesive, the reactive hot-melt adhesive is tacky and bonded to the fabric. Using these properties, a core material to be used for a brassiere, a waist nipper, or the like is formed with the reactive hot-melt adhesive, and the reactive hot-melt adhesive is applied by computer control without using a casing of fabric to insert the core material, so that the automation and accuracy in manufacturing are realized. That is, by providing an adhesive application step and a core material application step, the labor savings and automation in the process are realized.

The application method is performed by attaching a device for discharging the reactive hot-melt adhesive to an arm movable in two axial directions, such as an XY plotter, or a robot arm movable in three axial directions. The application position may be managed using absolute values of an X coordinate value and a Y coordinate value on a table where the fabric is placed, or may be managed printing a mark on the fabric, reading the mark with a camera, and using an X coordinate value and a Y coordinate value relative to the mark. When the application position is managed using the absolute value coordinates on the table, the process need be completed up to the cutting of the fabric on the table, but when the mark is provided, the process need not be completed on the table. In addition, it is also possible to fix a semi-finished product having been processed to some extent to the table and perform the application directly to the semi-finished product by using the robot arm or the like. The reactive hot-melt adhesive used here is a moisture curable type and a type that loses its surface tackiness in 20 seconds, and pieces of fabric can thus be layered on top of one another. Some reactive hot-melt adhesives lose the surface tackiness in one hour while others lose in 24 hours, depending on the type of resin.

Figure 1:
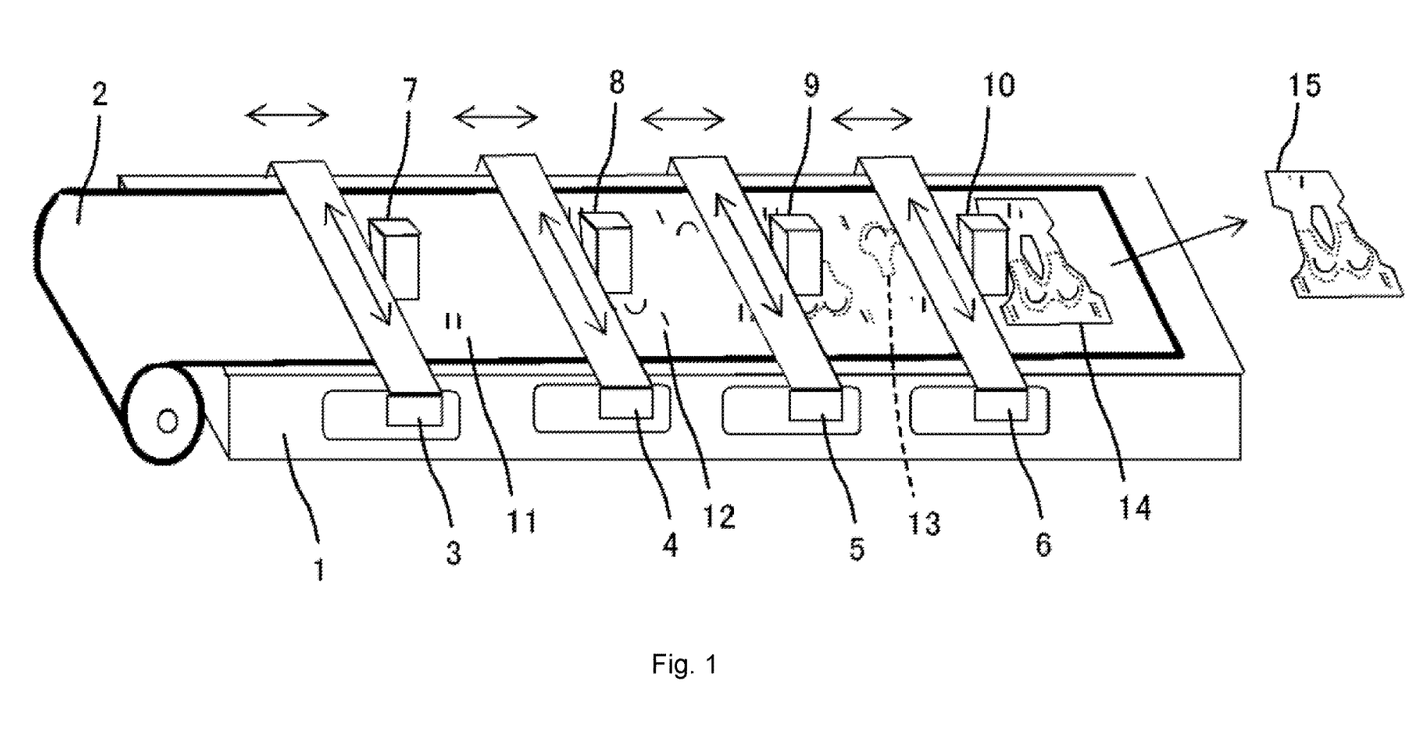
FIG. 1 is a diagram illustrating a configuration example of an apparatus that realizes a method for manufacturing a core-material-containing garment.

As an example of realizing the method for manufacturing a core-material-containing garment, an example will be described where a conveyor table 1 of a belt conveyor type compatible with a cutting plotter is used.

A fabric 2 is placed in the state of a wound at one end of the conveyor table 1 so that the fabric 2 is supplied onto the conveyor table 1 from the roll.

The fabric 2 may be temporarily suspended in front of the conveyor table 1 so as to be substantially relaxed or may be fed without being substantially relaxed. Here, the fabric 2 is fed without being substantially relaxed. The air is sucked on the conveyor table 1 to prevent the fabric 2 from being displaced on the belt of the conveyor table 1.

On the conveyor table 1, a printing unit 7 for printing a care label is attached to an arm 3 movable in vertical and horizontal directions, and a reactive hot-melt discharge unit 8 for applying a reactive hot-melt adhesive for the core material is attached to an arm 4 movable in the vertical and horizontal directions. Further, an ink-jet bonding hot-melt discharge unit 9 for applying a bonding hot-melt adhesive 13 is attached to an arm 5 movable in the vertical and horizontal directions. Here, pad printing is used for printing the care label.

Finally, a cutting blade 10 is attached to an arm 6 movable in the vertical and horizontal directions.

The fabric 2 is released from the roll onto the conveyor table 1, a care label 11 is printed on the conveyor table 1, the reactive hot-melt adhesive constituting a core material 12 and the bonding hot-melt adhesive 13 are applied, and the fabric 2 is cut into a predetermined shape along a cutting line 14 to obtain a cut piece 15.

The bonding hot-melt adhesive 13 is a polyurethane-based adhesive. The reactive hot-melt adhesive constituting the core material 12 is a polyurethane-based reactive hot-melt adhesive and is a moisture curable type.

The reactive hot-melt adhesive has strong adhesion to the fabric due to a three-dimensional crosslinking reaction. However, the reactive hot-melt adhesive is heat-resistant after the curing, and even after the application and adhesion of the bonding hot-melt adhesive, a portion to which the reactive hot-melt adhesive has been applied is not bonded to other fabric.

The reactive hot-melt adhesive used here loses its surface tackiness in 20 seconds after the application. The bonding hot-melt adhesive 13 is dried in 20 seconds by a drying step using hot air, and hence pieces of fabric can be layered on top of one another just appropriately without stopping the manufacturing process.

The drying step may be provided after the application step for the bonding hot-melt adhesive 13 or may be provided after the cutting of the fabric. Some reactive hot-melt adhesives lose the surface stickiness in one hour after the application while others lose in 24 hours, depending on the type of resin.

In addition, the reactive hot-melt adhesive can be mixed with nitrogen gas and foamed, and the softness after the curing can be adjusted by changing the amount of nitrogen gas added. Hence the reactive hot-melt adhesive is a moisture curable type that can improve the feel to the skin when the garment is worn. As the reactive hot-melt adhesive, other than the above, a moisture curable polyolefin based hot-melt adhesive (POR) and a moisture curable styrene elastomer (PSR) can be used.

The core material on the lower side of the cup section of the brassiere is located in an uneven portion of the human body, and hence the nitrogen gas is added and foamed to soften the feel to the human body. Further, the core material in the side section is located in a relatively flat portion of the human body and can thus be finished in a flat and thin state without the addition of the nitrogen gas. In this case, another application mechanism for the core material is required.

The core material obtained using the reactive hot-melt adhesive is made of resin and thus has less rigidity than a metal core material but can be imparted with predetermined rigidity depending on the shape of the application. A description, including the shape of the application, will be described below with examples.

Example 1

Figure 2:
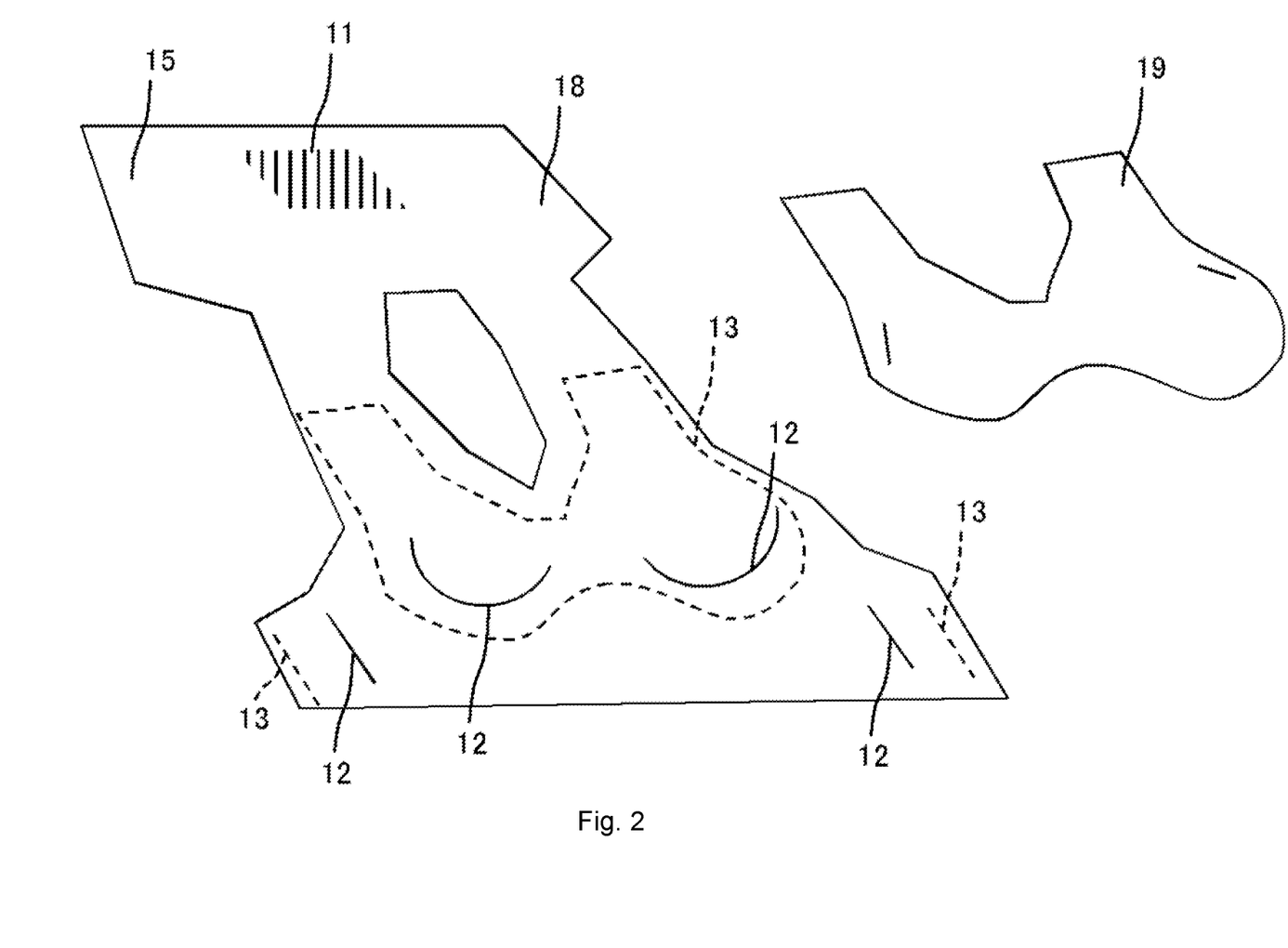
FIG. 2 is a view illustrating a semi-finished core-material-containing brassiere.
Figure 3:
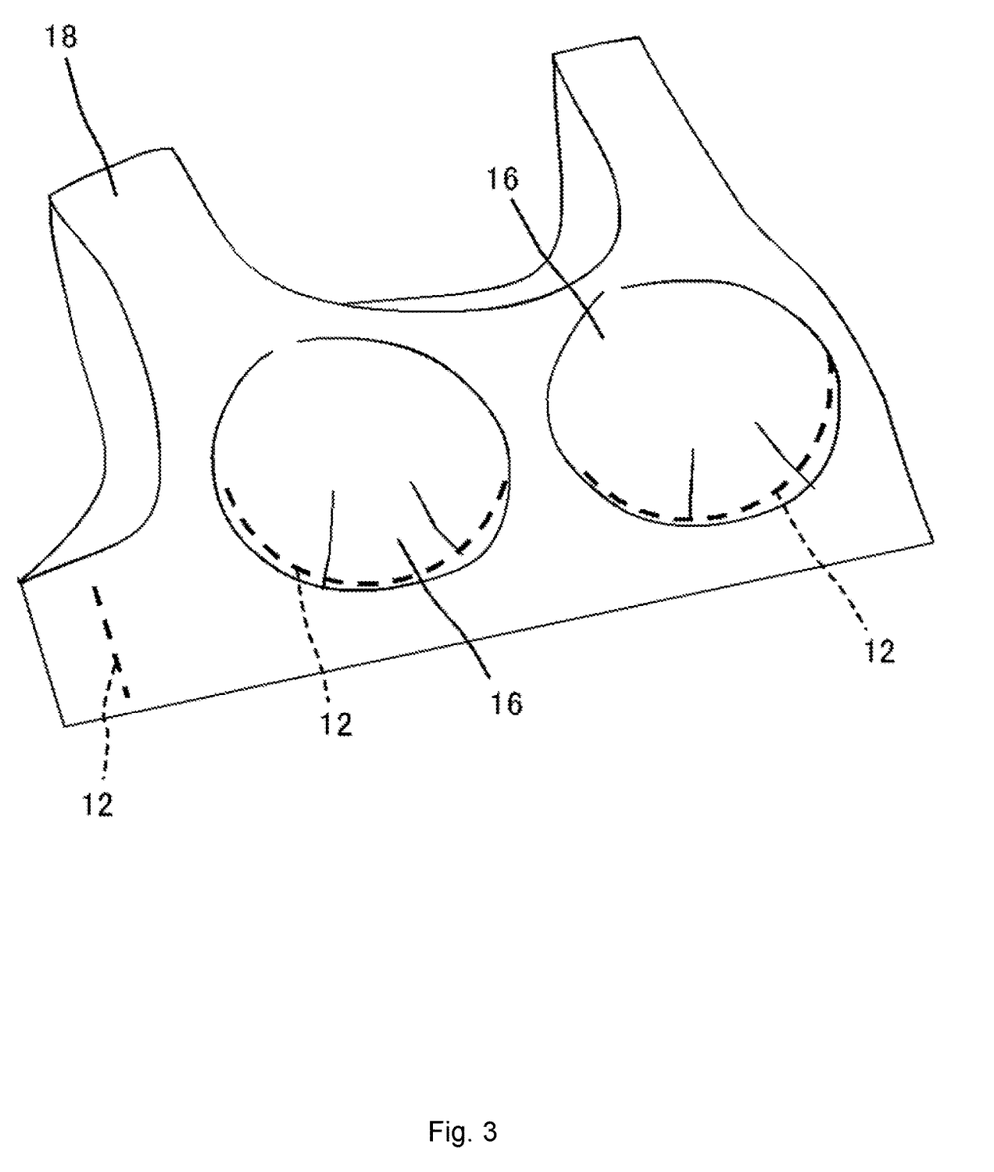
FIG. 3 is a view illustrating a core-material-containing brassiere.

FIG. 2 is the cut piece 15 of the brassiere produced by the above steps. The care label 11 is printed on a back body of a body fabric 18, and the core material 12 formed of the reactive hot-melt adhesive is bonded to a front body of the body fabric 18. In addition, the bonding hot-melt adhesive 13 is formed in an applied state in each of a place where a side section behind the back body and a side section of the front body are to be bonded to each other, and a place where a lining 19 of the front body is to be bonded. After the complete curing of the reactive hot-melt adhesive, the lining 19 is bonded, and the sides of the back body and the front body of the body fabric 18 are bonded to each other to complete a brassiere as illustrated in FIG. 3.

A cup section 16 may be molded after the bonding of the lining 19, or may not be molded when the fabric is well stretched. When, after application of the reactive hot-melt adhesive to one piece of fabric and curing of the applied reactive hot-melt adhesive, the other piece of fabric is superimposed on the core material formed by the curing and both pieces of fabric are bonded together with the bonding hot-melt adhesive while avoiding the core material portion, the core material of the reactive hot-melt adhesive is not caused to adhere to the other piece of fabric and comes into a non-adhesive state, thereby creating a space between the pieces of fabric and facilitating insertion of a pad or the like into the cup section. Note that such a procedure is not limited to the cup section but may also be applied to a back section and the like of the brassiere, and it is thereby possible to provide the space between the pieces of fabric while closing the pieces of fabric by bonding.

As described above, a brassiere with a supporting core material is completed with very few steps.

Example 2

Figure 4:
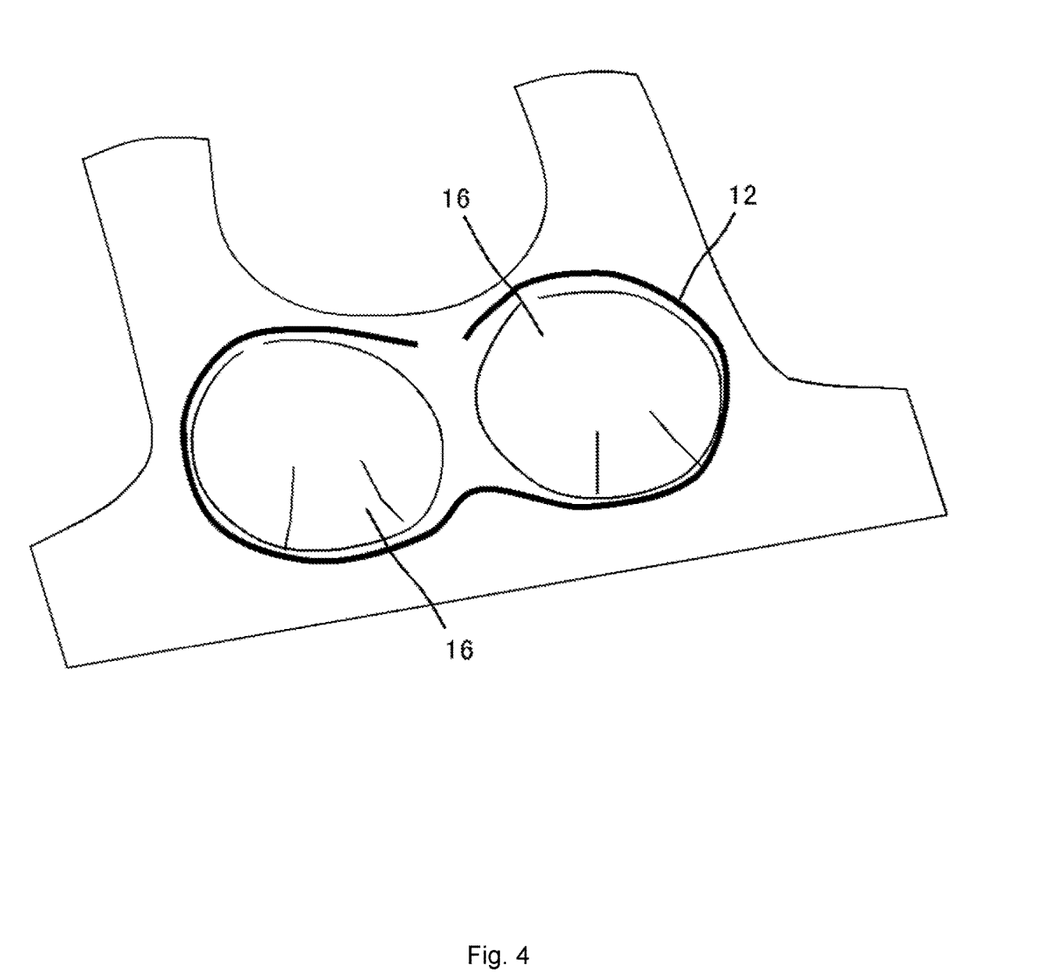
FIG. 4 is a view illustrating an example of placement of a core material.

This is an example in which, through the use of the system of Example 1, the core material 12 made of the reactive hot-melt adhesive is applied around the cup sections 16 to be formed into a small-ω shape, and a semi-finished product 20 is obtained.

The reason for the formation into the ω shape is to improve the supporting ability of the core material 12 of the reactive hot-melt adhesive, that is, to impart predetermined rigidity.

When the core material 12 is formed into an arc shape as in Example 1, there is only a sense of support rather than the case of a simple fabric, but by forming the core material 12 into the ω shape, the stretch of the fabric in the cup section can be restricted over a wide range, and enough a sense of support can be obtained. The cup section 16 is bulged by molding after complete curing of the reactive hot-melt adhesive.

Example 3

Figure 5:
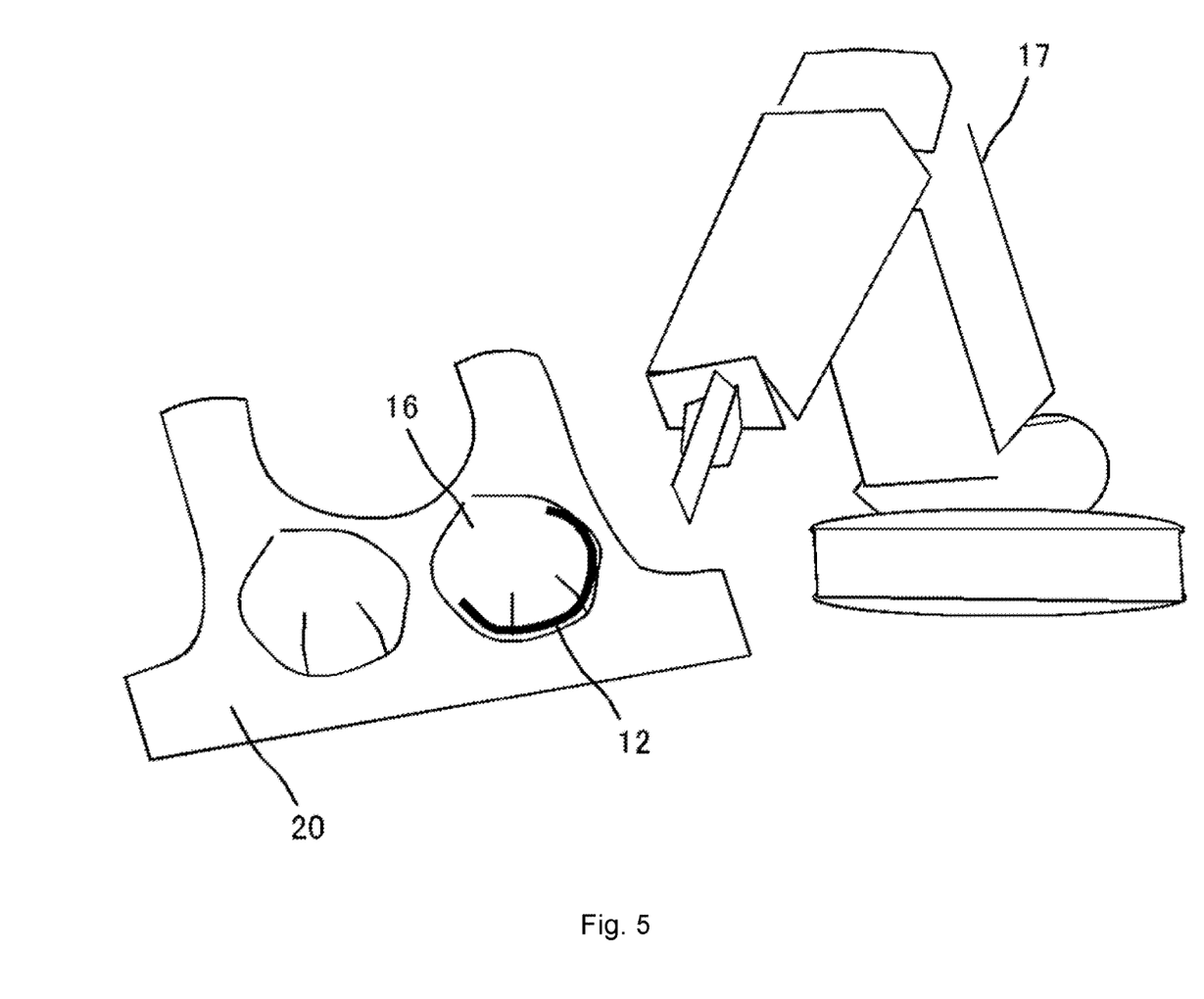
FIG. 5 is a view illustrating another example of formation of the core material.

This is an example in which the core material 12 is formed in such a manner that the reactive hot-melt adhesive is applied to the semi-finished product 20, obtained by molding the cup sections 16, by using a robot arm 17 capable of moving a discharge unit in the three axial directions without using the system of Example 1.

Figure 6:
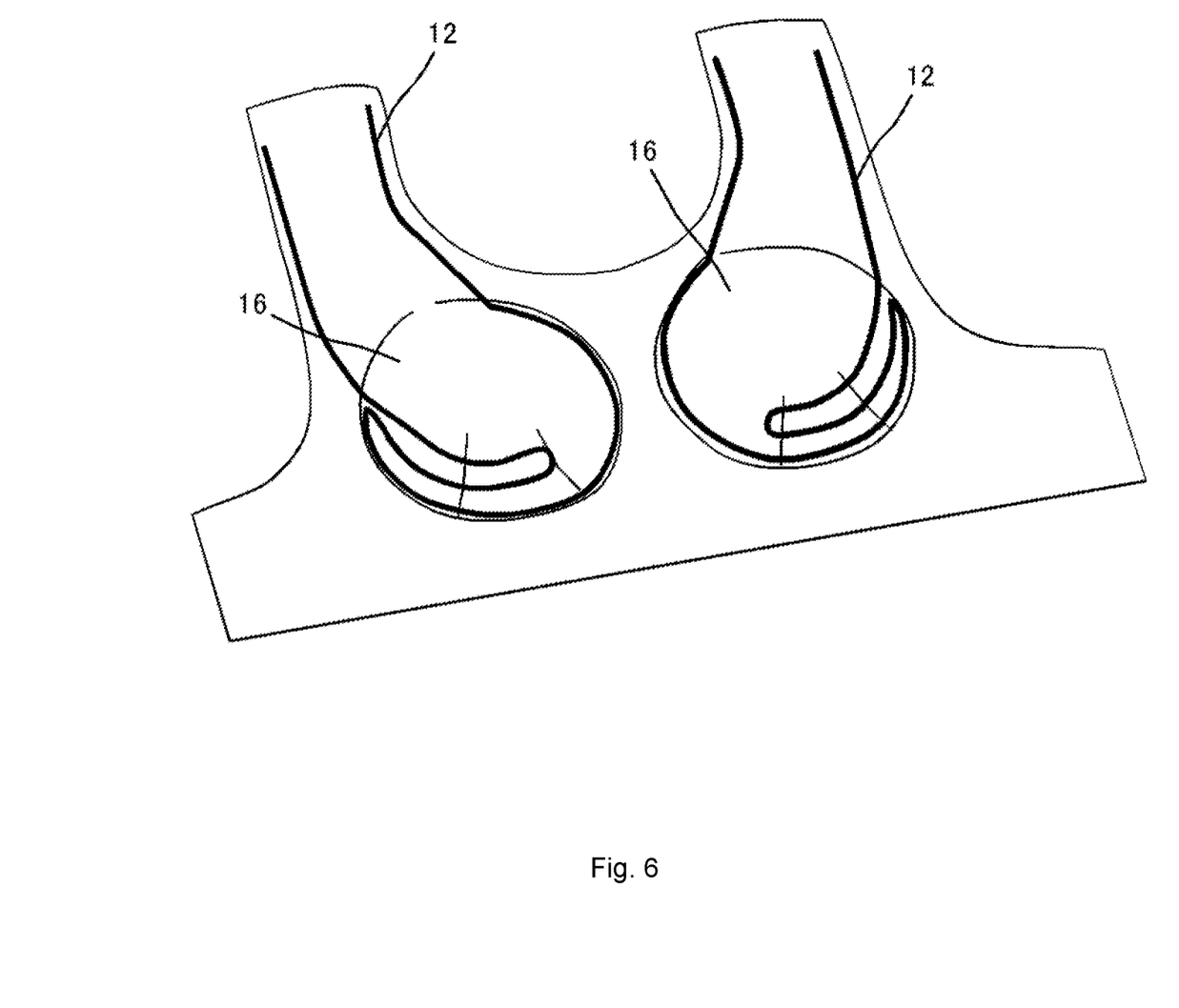
FIG. 6 is a view illustrating another example of the placement of the core material.

FIG. 6 is an application pattern of the reactive hot-melt adhesive.

The reactive hot-melt adhesive proceeds from the vicinity of the top of a shoulder strap section along the outer edge of the shoulder strap into the cup through a position in the vicinity of the side of the outer periphery of the cup section and above the half of the side, proceeds while curving slightly greater than the outer circumference of the hemisphere of the cup at each point to a position at a depth of about one-third from the top of the cup, and at the point in time of reaching a position at two-thirds of the lower side of the cup, the reactive hot-melt adhesive turns around and passes a point at two-thirds from the top of the cup along the outer periphery of the cup at that point. When approaching the point of the entry into the cup from the shoulder strap section, the reactive hot-melt adhesive further turns around and proceeds to the base of the inner edge of the shoulder strap along the outer periphery of the cup. Thereafter, the reactive hot-melt adhesive is applied to leave the outer periphery of the cup and reach the vicinity of the top of the shoulder strap along the inner edge of the shoulder strap. By performing the application in this manner, it is possible to support the side of the lower portion of the breast in a form close to a plane. In addition, since the low-stretch reactive hot-melt adhesive is continuously held to the shoulder strap, it is possible to prevent the top of the cup section from lowering due to the weight of the breast.

The reactive hot-melt adhesive may be mixed with the nitrogen gas and foamed so as to soften the feel of the core material.

INDUSTRIAL APPLICABILITY

The method for manufacturing a core-material-containing garment according to the present invention is useful as a method for manufacturing a garment using a core material, such as a brassiere or a waist nipper.

REFERENCE SIGNS LIST

1: conveyor table
2: fabric
3, 4, 5, 6: arm
7: printing unit
8: reactive hot-melt discharge unit
9: bonding hot-melt discharge unit
10: cutting blade
11: care label
12: core material
13: hot-melt adhesive
14: cutting line
15: cut piece
16: cup section
17: robot arm
18: body fabric
19: lining
20: semi-finished product

The invention claimed is:
1. A method for manufacturing a core-material-containing garment by using a core material configured to alter a body shape, the method comprising:
a linear core material application step of applying a reactive hot-melt adhesive to one piece of fabric lin- early and cured to form the core material to be used for a brassiere or waist nipper, the hot-melt adhesive being a moisture curable type;

an adhesive application step of applying a bonding hot-melt adhesive configured on a table, to bond the piece of fabric in which the linear core material is formed and another piece of fabric; and a drying step of drying the applied bonding hot-melt adhesive, wherein the adhesive application step, the bonding hot-melt adhesive is applied to the piece of fabric avoiding the formed core material, and then the other piece of fabric is superimposed on the formed core material, to prevent the formed core material from adhering to the other piece of fabric.

2. The method according to claim 1, comprising:

before the linear core material application step, a feeding step of feeding fabric in a wound state onto a table without relaxing or substantially relaxing the fabric.

3. The method according to claim 1, wherein the reactive hot-melt adhesive is mixed with nitrogen gas and foamed.

4. The method according to claim 1, wherein the reactive hot-melt adhesive is applied using an application device provided with a resin discharge unit that is movable in at least two axial directions of vertical and horizontal directions.

* * * * *